000
United States Patent [19]
Hausberg et al.

[11] 3,906,078
[45] Sept. 16, 1975

[54] PROCESS FOR REMOVING SULFUR OXIDES FROM INDUSTRIAL WASTE GAS

[75] Inventors: Gerhard Hausberg, Essen-Bredeney; Georg Kruger, Lunen; Karl-Martin Zentgraf, Essen, all of Germany

[73] Assignee: Firma G. Bischoff Bau Kompletter Gasreinigungs- und Wasserruckkuhlanlagen KG, Essen, Germany

[22] Filed: July 7, 1972

[21] Appl. No.: 269,773

Related U.S. Application Data

[63] Continuation-in-part of Ser. No. 197,996, Nov. 11, 1971, abandoned, which is a continuation of Ser. No. 813,133, April 3, 1969, abandoned.

[52] U.S. Cl. .............................................. 423/242
[51] Int. Cl. ........................................... C01b 17/00
[58] Field of Search ............................ 423/242–244

[56] References Cited
UNITED STATES PATENTS

| | | |
|---|---|---|
| 3,343,908 | 9/1967 | Wickert ............................ 423/244 |
| 3,520,649 | 7/1970 | Tomany et al. ..................... 423/242 |
| 3,607,001 | 9/1971 | Zinfer et al. ....................... 423/242 |
| 3,687,613 | 8/1972 | Rickard ............................ 423/242 |

*Primary Examiner*—Oscar R. Vertiz
*Assistant Examiner*—Gregory A. Heller
*Attorney, Agent, or Firm*—Karl F. Ross; Herbert Dubno

[57] ABSTRACT

Hot waste gases containing sulfur dioxide and trioxide are saturated with water vapor and admixed with lime, in the form of finely comminuted particles, on which the water condenses upon subsequent cooling of the gas stream by adiabatic expansion. The sulfur oxides, reacting with the lime of the particles, are converted into calcium sulfite and sulfate which dissolve in the precipitating droplets.

3 Claims, 2 Drawing Figures

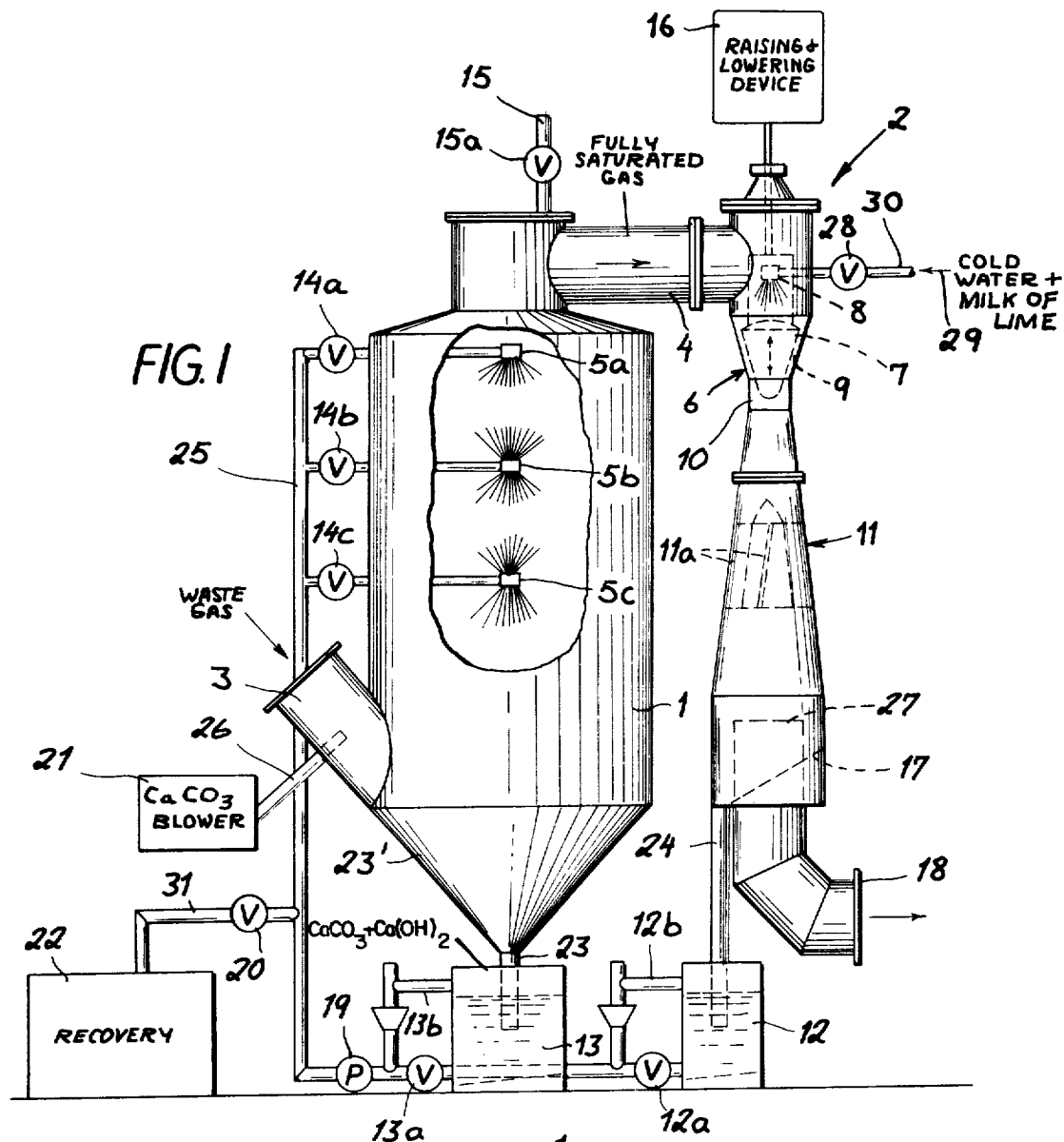
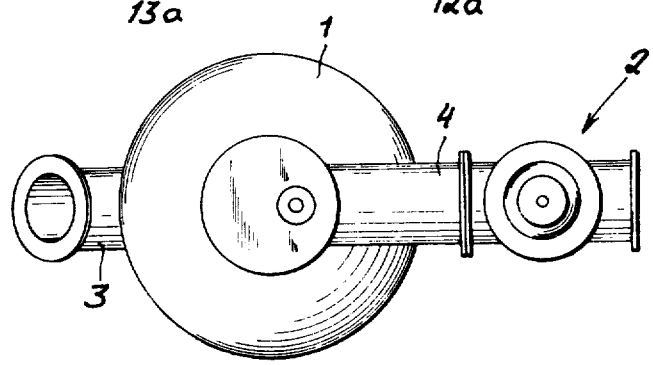

PROCESS FOR REMOVING SULFUR OXIDES FROM INDUSTRIAL WASTE GAS

This application is a continuation-in-part of our co-pending and now abandoned application Ser. No. 197,996 filed 11 Nov. 1971 as a continuation of our prior application Ser. No. 813,133 which was filed 3 April 1969 and is now abandoned.

Our present invention relates to a method of removing sulfur oxides from industrial waste gas, particularly flue gas from steel-making furnaces or smelting plants, ore-roasting furnaces, industrial heating plants using sulfurous fuels, etc.

It is well known that oxides of sulfur, particularly sulfur dioxide and sulfur trioxide, present a great air-pollution problem. Many industrial processes, e.g. the production of iron or steel, generate waste gases rich in these pollutants which form corrosive acids upon contact with moisture and are noxious to humans, animal life and plant life.

An important prior-art method of removing such sulfur compounds has been to pass the waste gas through a filter of activated carbon or some similar adsorbent. Such a method is expensive since it requires the discarding or regeneration of the filter and since it causes a substantial pressure drop in the gas being treated, thereby creating difficulties in reuse for some further smelting process, interfering with furnace draft, and requiring additional means to displace the gas. Furthermore, such methods are not highly efficient in that they do not remove sufficient proportions of the sulfur oxides.

It has also been proposed to scrub sulfur-containing flue gases with alkaline aqueous solutions of sodium hydroxide which may have been introduced directly into the water or may have been derived by hydrolysis from sodium carbonate. The sulfur oxides $SO_2$ and $SO_3$ react with the sodium hydroxide NaOH according to the formula

so as to be converted into water-soluble sodium sulfite and sulfate which are then washed out of the gas stream. This process, however, requires large amounts of water to carry the sodium hydroxide required for solubilization of the sulfur oxides which may amount to significant fractions of 1% of the gas flow.

The object of our present invention is to provide an improved process for removing sulfur oxides from a stream of hot waste gas with reduced quantities of liquid and consequently with maintenance of an elevated reaction temperature conducive to efficient solubilization.

We have found that this object can be realized, in accordance with the present invention, by introducing alkaline matter partly in the form of a substantially water-insoluble powder of small particle size (e.g. on the order of microns) into the hot gas stream (whose temperature is above 100°C) together with enough water to saturate the stream with vapor, these particles thereupon forming condensation nuclei on which the entrained moisture can condense as the gas stream is subsequently cooled, preferably by substantially adiabatic expansion after passage through a constriction at the exit end of a treatment zone in a wash tower. At the instant of condensation, surprisingly enough, the sulfur oxides in the vapor-saturated gas interact with the alkaline matter to form sulfites and sulfates in the droplets precipitating thereon on the solid particles.

The matter introduced into the gas stream may include calcium compounds, i.e. lime in its various forms such as quicklime (calcium oxide CaO), slaked lime (calcium hydroxide $Ca(OH)_2$) or air-slaked lime (calcium carbonate $CaCO_3$). As calcium oxide or carbonate it may be admixed with the gases prior to the injection of water; it can also be added, preferably in its hydrated form as milk of lime, to the injected water. In any case, the ultimate reaction is assumed to be

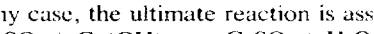

The term "water," as used herein, includes any aqueous medium with a pH of 7 or higher; thus, sodium hydroxide may have been dissolved therein to provide additional alkaline ions for interaction with the sulfur oxides. The water is advantageously injected in the form of a fine spray, which instantly vaporizes, upstream of a Venturi body or insert in the flow path, this insert constituting the aforementioned constriction on whose downstream side the fluid expands adiabatically to precipitate the entrained moisture on the accompanying solids. These solids may include, besides the calcium-containing particles added in the process, comminuted substances such as carbon black, iron oxides or fly ash originally entrained by the flue gases to be treated. The optimum amount of lime to be added depends, therefore, not only on the concentration of sulfur oxides in the gas but also on the proportion of such original solids. Thus, the rate of feed of the lime (or equivalent) particles to the gas or the water should equal at least a substantial fraction of the flow rate of original solids left in the gas stream.

The invention will be more fully described hereinafter with reference to the accompanying drawing in which:

FIG. 1 is a vertical section through an apparatus for carrying out the method of our invention; and FIG. 2 is a top view of the apparatus shown in FIG. 1.

As shown in FIGS. 1 and 2, our apparatus includes a wash tower 1 for saturating a hot sulfur-containing waste gas and a condenser 2 for removing the absorbed liquid.

The tower 1 has a downwardly inclined inlet 3 at its base for waste gas and an outlet 4 at the top for the gas which is saturated by very fine conical water jets from axially spaced but aligned spray nozzles 5a, 5b, 5c jointly connected to a riser pipe 25 by respective valves 14a, 14b, 14c. These nozzles are so-called rotary-spray or centrifugal nozzles as described, for example, in U.S. Pat. No. 3,140,163. A valve 15a in a pipe 15 branched off the outlet 4 enables sampling of the exiting gas. Excess wash liquid not absorbed by the waste gas is collected by a funnel 23' below the base of the tower and passes through a drain 23 into a settling tank or reservoir 13.

The condenser 2 consists of a generally J-shaped conduit 6 having a restricted neck 10 in which a tapering insert 7 is received. A raising and lowering device 16, as for example a simple screw arrangement, is provided to vary the width of a clearance 9 between the insert 7 and the walls of the conduit 6. Below and downstream of the insert 7 are provided a water separator 11 which may be of the uniflow-cyclone type as described on pages 20–73 of Perry's Chemical Engineers' Handbook (McGraw-Hill: 1963) having swirl vanes 11a; an impingement-baffle separator could also be used. Further downstream, a conduit 27 traversing an inclined baffle 17 leads to a discharge port 18; condensate collects in a settling tank 12 after running off the baffle 17 and through a drain pipe 24. A nozzle 8 similar to nozzles 5a – 5c sprays cold water from a supply 29 passing through a pipe 30 and a valve 28 into the conduit 16 just above the Venturi body 7. Clearance 9 defines an annular gap for the passage of gas and water.

The reservoirs 12 and 13 have respective upper runoff pipes 12b and 13b and lower drain valves 12a and 13a all connected through a pump 19 to the riser pipe 25 for recirculating the water to the nozzles 5a – 5c. A branch pipe 31 with a valve 20 leads to a recovery apparatus 22.

A blower 21 introduces highly comminuted calcium carbonate into the inlet 3 through a pipe 26. Calcium hydroxide $Ca(OH)_2$ in the form of an aqueous suspension (milk of lime) can be introduced, as shown, with the wash liquid from supply conduit 29.

The wash liquid, progressively enriched with calcium sulfate and sulfite, can be recirculated until it is no longer usable; it can then be channeled to apparatus 22 for recovery of these compounds and other constituents.

We claim:

1. A method of removing sulfur oxides from a hot waste gas, comprising the steps of:

passing a stream of sulfur-oxide-containing waste gas at a temperature above 100°C through a treatment zone;

saturating said stream in said treatment zone with water vapor in the presence of comminuted particles of a substantially water-insoluble substance dispersed through the stream, the latter containing alkaline matter selected from the group of calcium oxide, calcium hydroxide, and calcium carbonate and capable of reacting with said sulfur oxides, said gas stream being saturated by spraying same with an aqueous medium upstream of a constriction located at the exit end of said treatment zone, said particles being admixed with the gas stream ahead of said treatment zone;

cooling said stream by substantially adiabatic expansion upon emergence of the stream from said treatment zone to a level low enough to cause water condensation with resulting precipitation of water on said particles in the form of droplets containing sulfur compounds obtained by reaction of said alkaline matter with said sulfur oxides; and separating said droplets from the gas stream.

2. A method as defined in claim 1 wherein said substance includes calcium carbonate.

3. A method as defined in claim 1 wherein said alkaline matter is lime.

* * * * *